(12) United States Patent
Bergen

(10) Patent No.: US 6,208,765 B1
(45) Date of Patent: Mar. 27, 2001

(54) METHOD AND APPARATUS FOR IMPROVING IMAGE RESOLUTION

(75) Inventor: James Russell Bergen, Hopewell, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 09/100,853

(22) Filed: Jun. 19, 1998

(51) Int. Cl.$^7$ .............................. G06T 5/00; G06T 3/00; G06T 3/40; H04N 1/409

(52) U.S. Cl. .......................... 382/268; 382/268; 382/275; 382/293; 382/300

(58) Field of Search .................................... 382/284, 294, 382/268, 287, 289, 266, 269, 275, 276, 293, 299, 300; 358/447, 450, 463; 345/433, 436

(56) References Cited

U.S. PATENT DOCUMENTS

| | | |
|---|---|---|
| 4,797,942 | 1/1989 | Burt . |
| 5,264,933 | 11/1993 | Rosser et al. . |
| 5,325,449 | 6/1994 | Burt et al. . |
| 5,394,520 | 2/1995 | Hall . |
| 5,649,032 | 7/1997 | Burt et al. ............................ 382/284 |
| 5,657,402 | * 8/1997 | Bender et al. ....................... 382/284 |
| 5,767,987 | * 6/1998 | Wolff et al. ........................... 358/447 |
| 6,023,535 | * 2/2000 | Aoki .................................... 382/299 |

FOREIGN PATENT DOCUMENTS

| | | |
|---|---|---|
| 671707 | * 2/1995 | (EP) . |
| 874330 | * 10/1998 | (EP) . |
| 1024656 | * 1/2000 | (EP) . |

OTHER PUBLICATIONS

Burt, P. J., and Adelson, E. H., "A Multiresolution Spline With Application to Image Mosaics", ACM Transactions on Graphics, vol. 2; No. 4, pp. 217–236, Oct. 1983.

Burt, P. J., and Adelson, E. H., "Merging Images Through Pattern Decomposition", SPIE Vol. 575 Applicatyions of Digital Image Processing VIII, pp. 173–180, 1985.

McLean F. C., "Structured Video Coding", Masters Thesis, Massachusetts Institute of Technology, Jun. 1991.

Burt, P. J., Hansen, M., Anandan, P., "Video Mosaic Displays", SPIE vol. 2736 pp. 119–127, 1996.

* cited by examiner

Primary Examiner—Scott Rogers
(74) Attorney, Agent, or Firm—William J. Burke

(57) ABSTRACT

A method and apparatus that improves the quality of digital images. When provided a plurality of digital images, the method and apparatus aligns the digital images to a reference coordinate system, and synthesizes an enhanced image such that the regions of image overlap between any two images have substantially improved quality.

24 Claims, 2 Drawing Sheets

METHOD AND APPARATUS FOR IMPROVING IMAGE RESOLUTION

The invention relates to digital image processing systems and, more particularly, relates to a method and apparatus for improving the resolution of digital images.

BACKGROUND OF THE DISCLOSURE

Digital images frequently suffer from a range of impairments due to low digital capture resolution, low capture dynamic range, pixel defects (drop-outs), or other sensor or scanner limitations. Also, because compression techniques such as JPEG are frequently used to reduce the volume of data associated with digital images, image quality is often impaired due to compression artifacts. These artifacts include "blockiness", loss of visual texture, spurious contouring, and edge distortions. While the visibility of some artifacts can be reduced by digital filtering or other post processing techniques applied to a single image, these techniques may add further distortions.

Therefore, there is a need in the art for a method and apparatus that improves image quality without relying upon extensive post processing of a single image.

SUMMARY OF THE INVENTION

The disadvantages associated with the prior art are overcome by the present invention of a method and apparatus that improves the quality of digital images. The inventive technique is useful for imaging situations when multiple images having similar picture content are available for processing. When provided a plurality of digital images, the invention aligns the digital images to a reference coordinate system, and synthesizes an enhanced image such that the regions of image overlap between any two images have substantially improved quality. The synthesis process, in essence, combines information in overlapping regions to form an enhanced image that corrects many of the image impairments that result from image sampling and compression such as low digital capture resolution, low capture dynamic range, pixel defects (drop-outs) and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
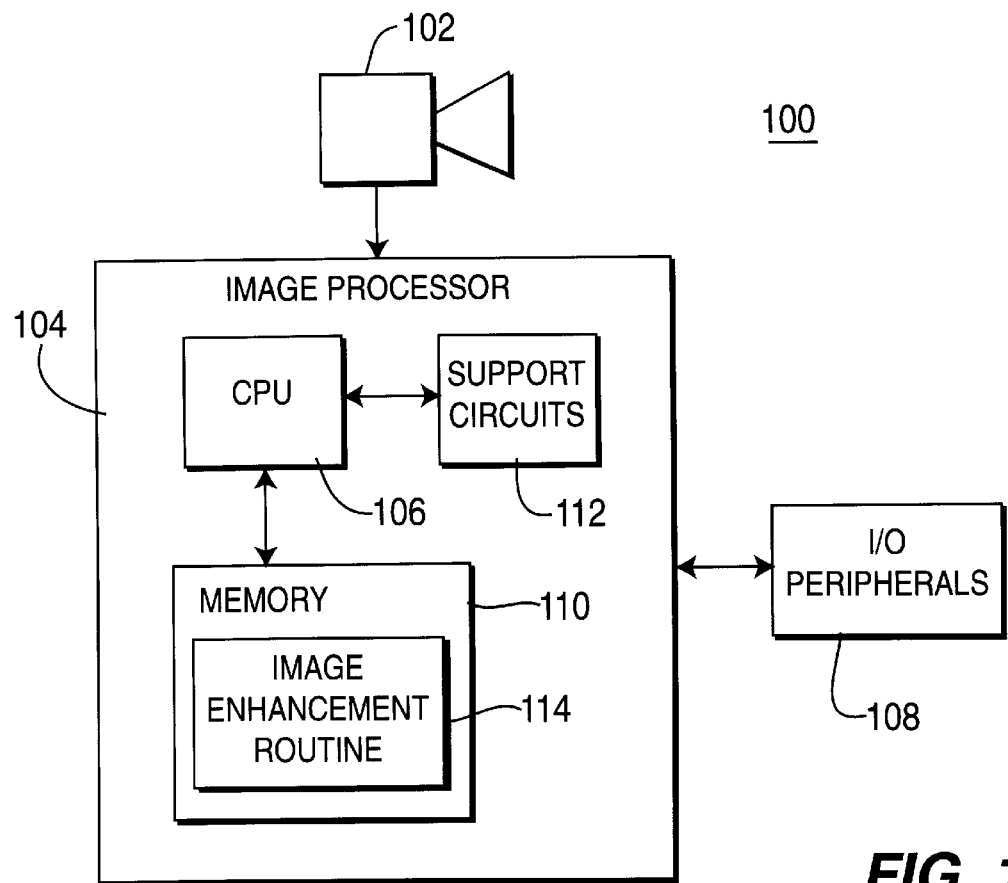
FIG. 1 depicts a general purpose computer system that is used to execute a routine to implement the invention.

FIG. 1 depicts a block diagram of an image processing system 100 comprising at least one image sensor (e.g., a camera 102, although other sensors may be used) and an image processor 104. The camera 102 is assumed to produce a plurality of digital still images or digital video frames, i.e., two-dimensional arrays of pixel values. However, the camera may be an analog sensor that produces an analog signal and additional circuitry may be used to convert the analog signals into digital images for processing. To process the digital images, the image processor 104 comprises a central processing unit (CPU) 106, a memory device 110, conventional CPU support circuits 112. The image processor may be a stand-alone computer system that is used to process images in accordance with the invention or the image processor may be embedded in a product such as a digital camera. When the invention is implemented using a general purpose computer system, the image processor 104 is generally coupled to conventional input/output (I/O) peripherals 108 such as a keyboard, a mouse, and a display. However, if the invention is implemented using an embedded processor in, for example, a digital camera, the general I/O peripherals may not be used. The CPU 106 is a general purpose computer that, when executing specific routines that are recalled form memory 110, becomes a specific purpose computer, e.g., an image processor. The CPU can be any high-performance processor such as a PENTIUM II® processor manufactured by Intel Corporation or a POWER PC® processor manufactured by Motorola Inc. The memory 110 can be random access memory (RAM), read only memory (ROM), a hard disk drive, a floppy disk drive or any combination thereof. The support circuits 212 include various conventional circuits such as frame grabber circuits, analog-to-digital (A/D) circuits, clock circuits, cache, power supplies, I/O drivers, and the like. The I/O peripherals 108 generally include a keyboard, a mouse, and a display, but may also include a video tape recorder, a video disk player, and the like. The images that are processed by the image processor 104 may not be sourced directly from a sensor (camera 102), but may also be sourced from pre-recorded images such as would be provided by a video tape recorder or other image storage device.

The present invention is embodied in an executable image processing routine 114 that, when executed by the CPU 108, provides an image resolution enhancement method and apparatus. Although the embodiment of the invention is described as a software implementation, those skilled in the art will realize that the invention can be implemented in hardware or as a combination of hardware and software. Thus each of the functional aspects of the routine can be wholly or partially implemented in one or mare hardware devices.

Figure 2:
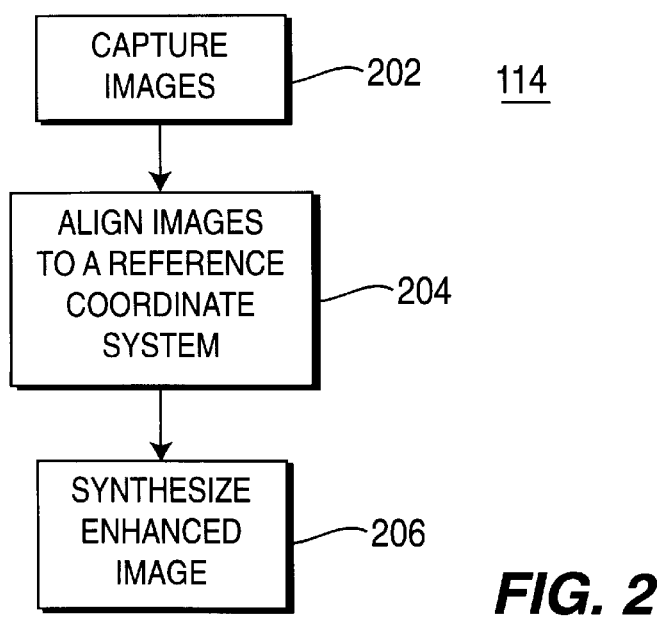
FIG. 2 depicts a flow diagram of a routine that represents the present invention.

FIG. 2 depicts a simplified flow diagram of the routine 114 of the present invention. The routine 114 begins at step 202 by capturing (or otherwise having supplied) a plurality of source images. These images are generally stored in the system RAM while being processed. The term captured should be broadly understood as to include recalling images from memory such as a hard disk drive, directly scanning images into RAM, or capturing images using a digital camera and storing the images in RAM, and the like. At step 204, the routine aligns the source images with a reference coordinate system. The coordinate system is generally the coordinate system of the output image (the enhanced image). Lastly, at step 206, the routine 114 synthesizes an enhanced image using the aligned source images.

To enhance the images, the invention assumes that any noise contained in the images is uncorrelated from one image to another while the scene information in the images is correlated. As such, by averaging multiple images, the noise content of the images is reduced while the signal content is enhanced relative to the noise content. Although the present invention can enhance any two images containing common subject matter, the best results occur when the two images are slightly different, i.e., each of the images is produced with a slightly different perspective. Having additional images sampled at slightly different locations is similar (once the images are aligned) to having a greater number of samples of the scene. Additionally, such artifacts as fixed pattern noise and compression effects usually occur at fixed image locations with respect to the sampling array. Having multiple images in which these errors are displaced with respect to each other means that, with high probability, the combined image will show reduced error amplitude.

Figure 3:
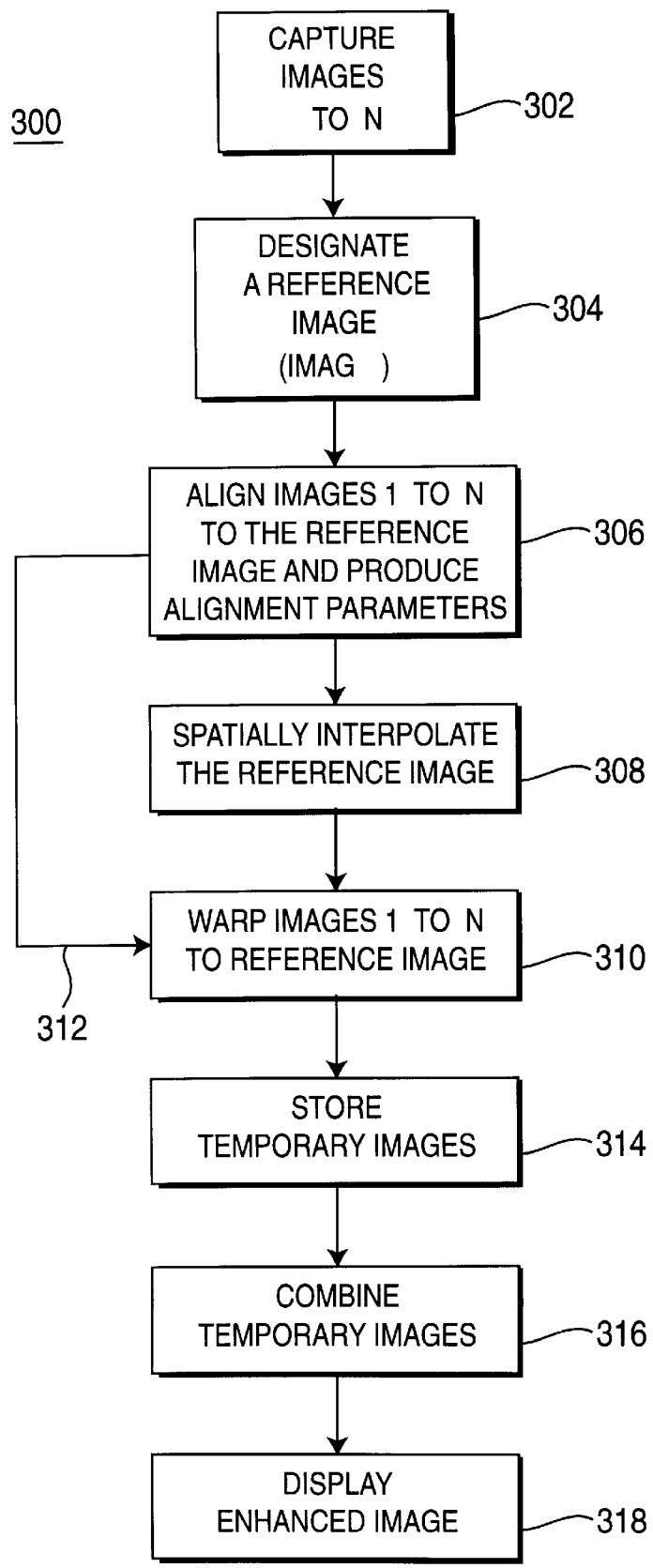
FIG. 3 depicts a detailed flow diagram of an embodiment of the present invention used to enhance images produced by a hand-held still image camera.

FIG. 3 depicts a more detailed flow diagram of an illustrative embodiment 300 of the invention, where the source images are produced by a hand-held digital camera. At step 302, the source images are captured in rapid succession while the camera is pointed steadily at a target (scene), but with a small amount of motion between frames due to slight unsteadiness of the hand-held camera. At step 304, the first image (image 0) in the sequence is designated the "reference image" and, at step 306, the image information in each of the subsequent images is aligned to this image using an affine transformation. These affine transformations are estimated by analyzing each subsequent image together with the reference image using a multiresolutional direct estimation process described in U.S. Pat. No. 5,649,032 issued Jul. 15, 1997 and hereby incorporated herein by reference.

Once aligned, the reference image, at step 308, is spatially interpolated to double its sample density using a fourth order Langragian interpolation method. The affine transformations (the parameters are supplied to step 310 via path 312) are then used in step 310 to warp each respective source image to create temporary images all of which are represented with respect to the interpolated reference image coordinate system. The temporary images are temporarily stored in memory at step 314. Finally, at step 316, these temporary images are recalled from memory and combined using a "trimmed mean" process in which the pixel values at a location in each temporary (and reference) image are sorted and averaged after the largest and the smallest are discarded. This mode of combination provides some of the noise reduction effects of averaging while also allowing rejection of large amplitude artifacts that would distort a simple average. At step 318, the enhanced image is displayed (and/or stored). The process of the present invention corrects many of the image impairments that generally result from image sampling and compression such as low digital capture resolution, low capture dynamic range, pixel defects (dropouts) and the like.

Although the source images are discussed as being captured by a hand-held camera having inherent movement, the movement could be intentionally added by intentionally moving the camera. Additionally, the reference coordinate system was arbitrarily chosen to be the first image coordinate system. However, the coordinate system can be that associated with any of the source images or any arbitrary coordinate system. Furthermore, the illustrative embodiment used, at step 306, an affine transformation to align the images. This transformation should be considered illustrative of one particular alignment process. Any alignment process that achieves sub-pixel alignment of the source images would be appropriate. For example, if the images are captured using a large camera rotation, a projective transformation would be more appropriate.

Although various embodiments which incorporate the teachings of the present invention have been shown and described in detail herein, those skilled in the art can readily devise many other varied embodiments that still incorporate these teachings.

What is claimed is:

1. A method for producing an enhanced quality digital image from a plurality of source images representing a scene comprising the steps of:

selecting one of the source images as a reference image;

aligning image information within each source image with a reference coordinate system of said reference image;

spatially interpolating pixels in said reference image;

warping each of the other source images with respect to said spatially interpolated reference image to produce a plurality of warped images; and combining the image information in each of said warped images to produce an enhanced image.

2. The method of claim 1 wherein the enhanced image corrects image impairments that result from image sampling and compression.

3. The method of claim 2 wherein said image impairments include low digital capture resolution, low capture dynamic range, or pixel defects.

4. The method of claim 1 further comprising the step of sourcing said source images from a digital camera.

5. The method of claim 1 wherein said alignment step further comprises the steps of:

registering said source images to said reference coordinate system using an affine transformation; and producing transformation parameters that define said alignment.

6. The method of claim 5 wherein said transformation parameters are used in said warping step.

7. The method of claim 1 wherein said spatially interpolating step uses a fourth order Langragian interpolation method to double a sample density of said reference image.

8. The method of claim 1 wherein said combining step uses a trimmed mean process, where the pixel values at a location in each warped source image and reference image are sorted and averaged after a largest pixel value and a smallest pixel value are discarded.

9. Apparatus for producing an enhanced quality digital image from a plurality of source images representing a scene comprising:

an image selector for selecting one of the source images as a reference image;

an image alignment module for aligning image information within each source image with a reference coordinate system of said reference image;

a pixel interpolator for spatially interpolating pixels in said reference image;

an image warping module for warping each of the other source images with respect to said spatially interpolated reference image to produce a plurality of warped images; and an image combining module for combining the image information in each of said warped images to produce an enhanced image.

10. The apparatus of claim 9 wherein the enhanced image corrects image impairments that result from image sampling and compression.

11. The apparatus of claim 10 wherein said image impairments include low digital capture resolution, low capture dynamic range, or pixel defects.

12. The apparatus of claim 9 further comprising a digital camera.

13. The apparatus of claim 9 wherein said image alignment module further comprises:

an image registration module for registering said source images to said reference coordinate system using an affine transformation and producing transformation parameters that define said alignment.

14. The apparatus of claim 13 wherein said transformation parameters are used in said image warping module.

15. The apparatus of claim 9 wherein said pixel interpolator uses a fourth order Langragian interpolation method to double a sample density of said reference image.

16. The apparatus of claim 9 wherein said image combining module uses a trimmed mean process, where the pixel values at a location in each warped source image and reference image are sorted and averaged after a largest pixel value and a smallest pixel value are discarded.

17. A digital storage medium containing a program that, when executed by a general purpose computer, causes the computer to perform a method for producing an enhanced quality digital image from a plurality of source images representing a scene comprising the steps of:

selecting one of the source images as a reference image;

aligning image information within each source image with a reference coordinate system of said reference image;

spatially interpolating pixels in said reference image;

warping each of the other source images with respect to said spatially interpolated reference image to produce a plurality of warped images; and combining the image information in each of said warped images to produce an enhanced image.

18. The medium of claim 17 wherein the enhanced image corrects image impairments that result from image sampling and compression.

19. The medium of claim 18 wherein said image impairments include low digital capture resolution, low capture dynamic range, or pixel defects.

20. The medium of claim 17 wherein the method further comprises the step of sourcing said source images from a digital camera.

21. The medium of claim 17 wherein said alignment step performed by said method further comprises the steps of:

registering said source images to said reference coordinate system using an affine transformation; and producing transformation parameters that define said alignment.

22. The medium of claim 21 wherein said transformation parameters are used in said warping step.

23. The medium of claim 17 wherein said spatially interpolating step uses a fourth order Langragian interpolation method to double a sample density of said reference image.

24. The medium of claim 17 wherein said combining step uses a trimmed mean process, where the pixel values at a location in each warped source image and reference image are sorted and averaged after a largest pixel value and a smallest pixel value are discarded.

* * * * *